United States Patent
Zaffou et al.

(10) Patent No.: US 8,668,997 B2
(45) Date of Patent: Mar. 11, 2014

(54) SYSTEM AND METHOD FOR SENSING AND MITIGATING HYDROGEN EVOLUTION WITHIN A FLOW BATTERY SYSTEM

(75) Inventors: Rachid Zaffou, West Hartford, CT (US); Arun Pandy, Manchester, CT (US); Michael L. Perry, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 208 days.

(21) Appl. No.: 13/164,059

(22) Filed: Jun. 20, 2011

(65) Prior Publication Data

US 2012/0321916 A1    Dec. 20, 2012

(51) Int. Cl.
*H01M 2/38* (2006.01)

(52) U.S. Cl.
USPC ............... 429/51; 429/50; 429/70; 429/101; 429/188; 429/231.5

(58) Field of Classification Search
USPC ........... 429/50, 51, 70, 99, 101, 15, 149, 163, 429/188, 307, 324, 231.5
See application file for complete search history.

(56) References Cited

U.S. PATENT DOCUMENTS

| | | | |
|---|---|---|---|
| 4,786,567 A | 11/1988 | Skyllas-Kazacos et al. | |
| 5,156,929 A | 10/1992 | Dec et al. | |
| 5,897,766 A * | 4/1999 | Kawatsu | 204/426 |
| 6,468,688 B2 | 10/2002 | Kazacos et al. | |
| 6,617,068 B2 | 9/2003 | Dufner et al. | |
| 7,078,118 B2 | 7/2006 | Schrooten et al. | |
| 7,265,456 B2 | 9/2007 | Hennessy | |
| 7,353,083 B2 | 4/2008 | Hennessy | |
| 7,438,986 B2 | 10/2008 | Shimotori et al. | |
| 7,473,485 B2 | 1/2009 | Burlatsky et al. | |
| 7,855,005 B2 | 12/2010 | Sahu | |
| 2005/0066707 A1 | 3/2005 | Katsuki et al. | |
| 2005/0158614 A1* | 7/2005 | Hennessy | 429/61 |

(Continued)

FOREIGN PATENT DOCUMENTS

| | | |
|---|---|---|
| DE | 10308395 | 9/2004 |
| JP | 2002022700 | 1/2002 |
| JP | 2003148252 | 5/2003 |
| JP | 2003157884 | 5/2003 |
| WO | 9003666 | 4/1990 |

OTHER PUBLICATIONS

Ponce de Leon et al. "Redox Flow Cells for Energy Conversion", Journal of Power Sources 160, May 26, 2006, pp. 716-732.
International Search Report for PCT/US2012/04340 dated Oct. 29, 2012.

*Primary Examiner* — Patrick Ryan
*Assistant Examiner* — Ben Lewis
(74) *Attorney, Agent, or Firm* — O'Shea Getz P.C.

(57) ABSTRACT

A method is provided for mitigating hydrogen evolution within a flow battery system that includes a plurality of flow battery cells, a power converter and an electrochemical cell. The method includes providing hydrogen generated by the hydrogen evolution within the flow battery system to the electrochemical cell. A first electrical current generated by an electrochemical reaction between the hydrogen and a reactant is sensed, and the sensed current is used to control an exchange of electrical power between the flow battery cells and the power converter.

10 Claims, 4 Drawing Sheets

(56) References Cited

U.S. PATENT DOCUMENTS

| | | |
|---|---|---|
| 2006/0183016 A1 | 8/2006 | Kazacos et al. |
| 2007/0157922 A1 | 7/2007 | Radhakrishnan et al. |
| 2008/0090129 A1 | 4/2008 | Kunz et al. |
| 2009/0014059 A1 | 1/2009 | Radhakrishnan et al. |
| 2010/0025241 A1* | 2/2010 | Hane et al. .................. 204/432 |
| 2010/0143809 A1 | 6/2010 | Perry et al. |
| 2010/0216038 A1 | 8/2010 | Cardenas-Valencia et al. |
| 2011/0045332 A1 | 2/2011 | Horne et al. |

* cited by examiner

SYSTEM AND METHOD FOR SENSING AND MITIGATING HYDROGEN EVOLUTION WITHIN A FLOW BATTERY SYSTEM

BACKGROUND

1. Technical Field

This disclosure relates generally to flow batteries and, in particular, to a system and method for sensing and mitigating hydrogen evolution within a flow battery system.

2. Background Information

A typical flow battery system includes a flow battery stack, an anolyte reservoir and a catholyte reservoir. An anolyte solution is circulated between the anolyte reservoir and the flow battery stack. A catholyte solution is circulated between the catholyte reservoir and the flow battery stack.

During operation, the flow battery stack may convert electrical energy into chemical energy, and store the chemical energy in the anolyte and catholyte solutions. Hydrogen evolution within the anolyte solution, however, may also occur as the electrical energy is being converted to chemical energy. The term "hydrogen evolution" describes a secondary reaction where positively charged hydrogen ions combine with negatively charged electrons to form hydrogen gas. The formation of hydrogen within the anolyte solution may decrease system efficiency and may also create an imbalance between the states of charge of the anolyte and catholyte solutions. It also may result in unsustainable changes to the composition of the solutions, which may require these solutions to be replenished. There is a need for a system and method for sensing and mitigating hydrogen evolution within a flow battery system.

DETAILED DESCRIPTION

Figure 1:
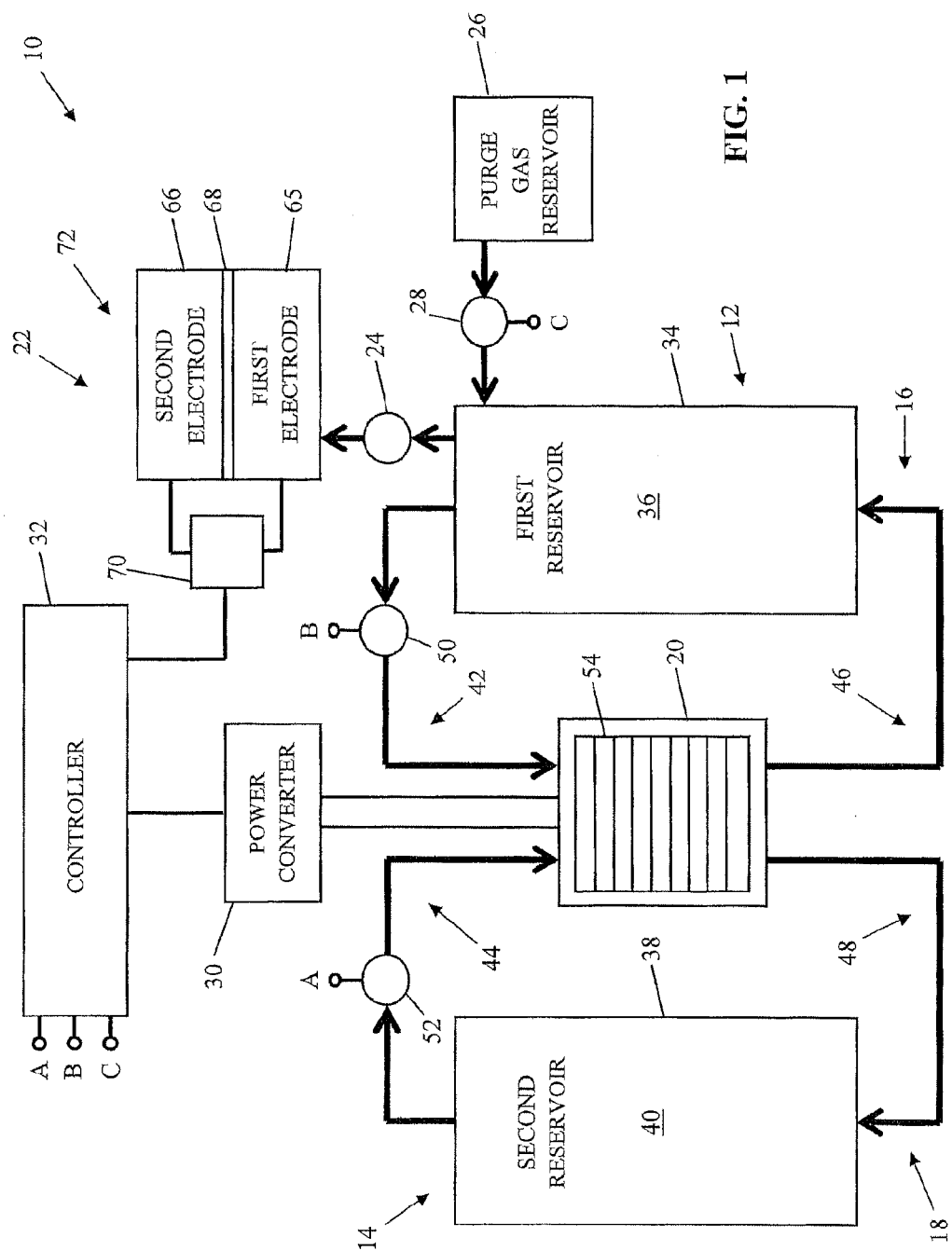
FIG. 1 illustrates a flow battery system.

FIG. 1 illustrates a flow battery system 10. The flow battery system 10 includes a first reservoir 12, a second reservoir 14, a first solution flow circuit 16, a second solution flow circuit 18, a flow battery stack 20, an electrochemical cell 22, a valve 24, a purge gas reservoir 26, a purge gas flow regulator 28, a power converter 30, and a controller 32.

The first reservoir 12 has an exterior reservoir wall 34 and contains a first solution (e.g., a vanadium anolyte) within an interior reservoir cavity 36, where the first solution has a first reversible reduction-oxidation ("redox") couple reactant (e.g., $V^{2+}$ and/or $V^{3+}$ ions). The second reservoir 14 has an exterior reservoir wall 38 and contains a second solution (e.g., a vanadium catholyte) within an interior reservoir cavity 40, where the second solution has a second reversible redox couple reactant (e.g., $V^{4+}$ and/or $V^{5+}$ ions).

The first and second solution flow circuits 16 and 18 each include a source conduit 42, 44, a return conduit 46, 48 and a solution flow regulator 50, 52, respectively. The solution flow regulator 50, 52 may include a variable speed pump connected, for example, inline within the source conduit 42, 44.

The flow battery stack 20 includes one or more flow battery cells 54.

Figure 2:
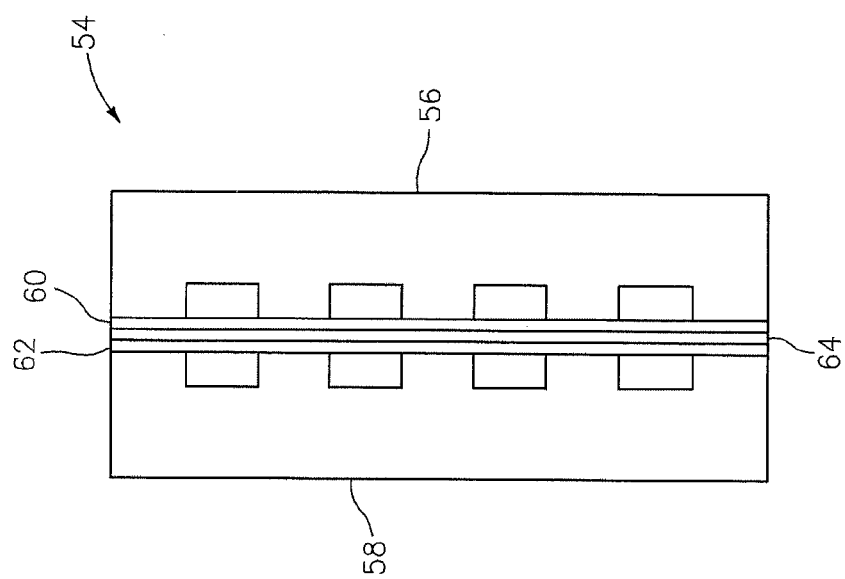
FIG. 2 illustrates a cross-section of a flow battery cell.

FIG. 2 illustrates a cross-section of one of the flow battery cells 54 shown in FIG. 1. Each flow battery cell 54 includes a first current collector 56, a second current collector 58, a liquid-porous first electrode layer 60, a liquid-porous second electrode layer 62, and a separator 64 between the first and second electrode layers 60 and 62. The first electrode layer 60 may be an anode, and the second electrode layer 62 may be a cathode. The separator 64 may be an ion-exchange membrane (e.g., a Nafion® polymer membrane manufactured by DuPont of Wilmington, Del., United States). The electrode layers 60 and 62 are positioned between the first and second current collectors 56 and 58. Additional examples of flow battery cells are disclosed in PCT/US09/68681, and U.S. patent application Ser. Nos. 13/084,156 and 13/023,101, each of which is incorporated by reference in its entirety.

Referring to FIGS. 1 and 2, the source conduit 42 fluidly connects the first reservoir 12 to the flow battery stack 20 such that the first current collector 56 and/or the first electrode layer 60 in each flow battery cell 54 receives the first solution. The return conduit 46 reciprocally connects the flow battery stack 20 to the first reservoir 12 such that the first reservoir 12 receives the first solution from the first current collector 56 and/or the first electrode layer 60 in each flow battery cell 54. The source conduit 44 fluidly connects the second reservoir 14 to the flow battery stack 20 such that the second current collector 58 and/or the second electrode layer 62 in each flow battery cell 54 receives the second solution. The return conduit 48 reciprocally connects the flow battery stack 20 to the second reservoir 14 such that the second reservoir 14 receives the second solution from the second current collector 58 and/or the second electrode layer 62 in each flow battery cell 54.

Referring to FIG. 1, the electrochemical cell 22 may be configured as a hydrogen sensor. The electrochemical cell 22 includes a gas-porous first electrode layer 65, a gas-porous second electrode layer 66, a separator 68, and a current sensor 70. The first electrode layer 65 may be an anode, and the second electrode layer 66 may be a cathode. The separator 68 may be a proton-exchange or anion exchange electrolyte layer. The separator 68 is configured between the first and second electrode layers 65 and 66 such that the electrode layers 65 and 66 and the separator 68 may form a fuel cell 72. Other examples of a fuel cell are disclosed in U.S. Pat. Nos. 5,156,929 and 6,617,068, each of which is hereby incorporated by reference in its entirety. The current sensor 70 is electrically connected between the first and second electrode layers 65 and 66.

The valve 24 may be a one-way check valve. The valve 24 fluidly connects the first reservoir 12 to the electrochemical cell 22 and, in particular, a top region of the interior reservoir cavity 36 to the first electrode layer 65. The first electrode layer 65 therefore is located outside of the exterior reservoir wall 34 in the embodiment shown in FIG. 1.

The purge gas reservoir 26 contains purge gas such as, for example, nitrogen ($N_2$) gas. Other examples of purge gas include inert gases such as carbon dioxide ($CO_2$) gas, Argon gas, etc.

The purge gas flow regulator 28 may include a variable speed pump or an electronically actuated valve (e.g., a one-way valve). The purge gas flow regulator 28 fluidly connects the purge gas reservoir 26 to the first reservoir 12.

The power converter 30 may include a two-way power converter or a pair of one-way power converters. The power converter 30 may be configured as, for example, a two-way power inverter or a two-way DC/DC converter connected to a DC bus (not shown). The power converter 30 is electrically connected to the flow battery stack 20. For example, the power converter 30 may be electrically connected to the first and second current collectors 56 and 58.

The controller 32 may be implemented using hardware, software, or a combination thereof. The hardware may include, for example, one or more processors, a memory, analog and/or digital circuitry, etc. The controller 32 is in signal communication (e.g., hardwired or wirelessly connected) with the flow regulators 50 and 52, the current sensor 70, the purge gas flow regulator 28 and the power converter 30.

The flow battery system 10 may be operated in an energy storage mode to store energy in the first and second solutions, or in an energy discharge mode to discharge energy from the first and second solutions. During both modes of operation, the controller 32 signals the solution flow regulator 50 to circulate the first solution between the first reservoir 12 and the flow battery stack 20 through the first solution flow circuit 16. The controller 32 signals the solution flow regulator 52 to circulate the second solution between the second reservoir 14 and the flow battery stack 20 through the second solution flow circuit 18. The controller 32 also signals the power converter 30 to exchange electrical current with (e.g., provide electrical current to, or receive electrical current from) the flow battery stack 20 and, thus, the flow battery cells 54 at a rate that corresponds to a selected current density within the cells 54. The term "current density" describes a ratio of (i) total current delivered to or drawn from the flow battery stack 20 to (ii) an active area (not shown) of one of the flow battery cells 54, and in particular, of the separator 64 (see FIG. 2). Alternatively, the electrical energy may be exchanged such that there is a substantially constant exchange of power between the power converter 30 and the flow battery stack 20, or the voltage of the power converter may be held constant. Or, any combination of galvanostatic, potentiostatic, or constant power modes may be utilized.

During the energy storage mode of operation, the electrical energy provided to the flow battery stack 20 from the power converter 30 is converted to chemical energy. The conversion process occurs through electrochemical reactions in the first solution and the second solution, and a transfer of non-redox couple reactants (e.g., $H^+$ ions) from the first solution to the second solution across each of the flow battery cells 54 and, in particular, each of the separators 64. The chemical energy is then stored in the first and second solutions, which are respectively stored in the first and second reservoirs 12 and 14. During the energy discharge mode of operation, the chemical energy stored in the first and second solutions is converted back to electrical current through reverse electrochemical reactions in the first solution and the second solution, and the transfer of the non-redox couple reactants from the second solution to the first solution across each of the flow battery cells 54. The electrical current is then provided to the power converter 30 from the flow battery stack 20.

Hydrogen evolution may occur within the first solution during the energy storage mode of operation when, for example, the first solution has reached an especially high state of charge (e.g., greater than approximately 90% of the $V^{+3}$ ions have been converted to $V^{+2}$ ions). The term "hydrogen evolution" describes a secondary reaction to the desired energy storage process where positively charged hydrogen ions combine with negatively charged electrons. For example, instead of the desired energy storage reaction $(2V^{+3}+2e^-\rightarrow 2V^{+2})$ occurring, the following secondary hydrogen evolution reaction occurs: $2H^++2e^-\rightarrow H_2$. The electrons are produced by the reaction in the second solution (e.g., $2V^{+4}\rightarrow 2V^{+5}+2e^-$). Disadvantageously, the formation of hydrogen within the first solution may decrease system efficiency since the electrical energy is not converted into the stored chemicals (i.e., the redox couples). Additionally, the secondary reaction can result in an imbalance between the states of charge of the first solution and the second solution.

Figure 3:
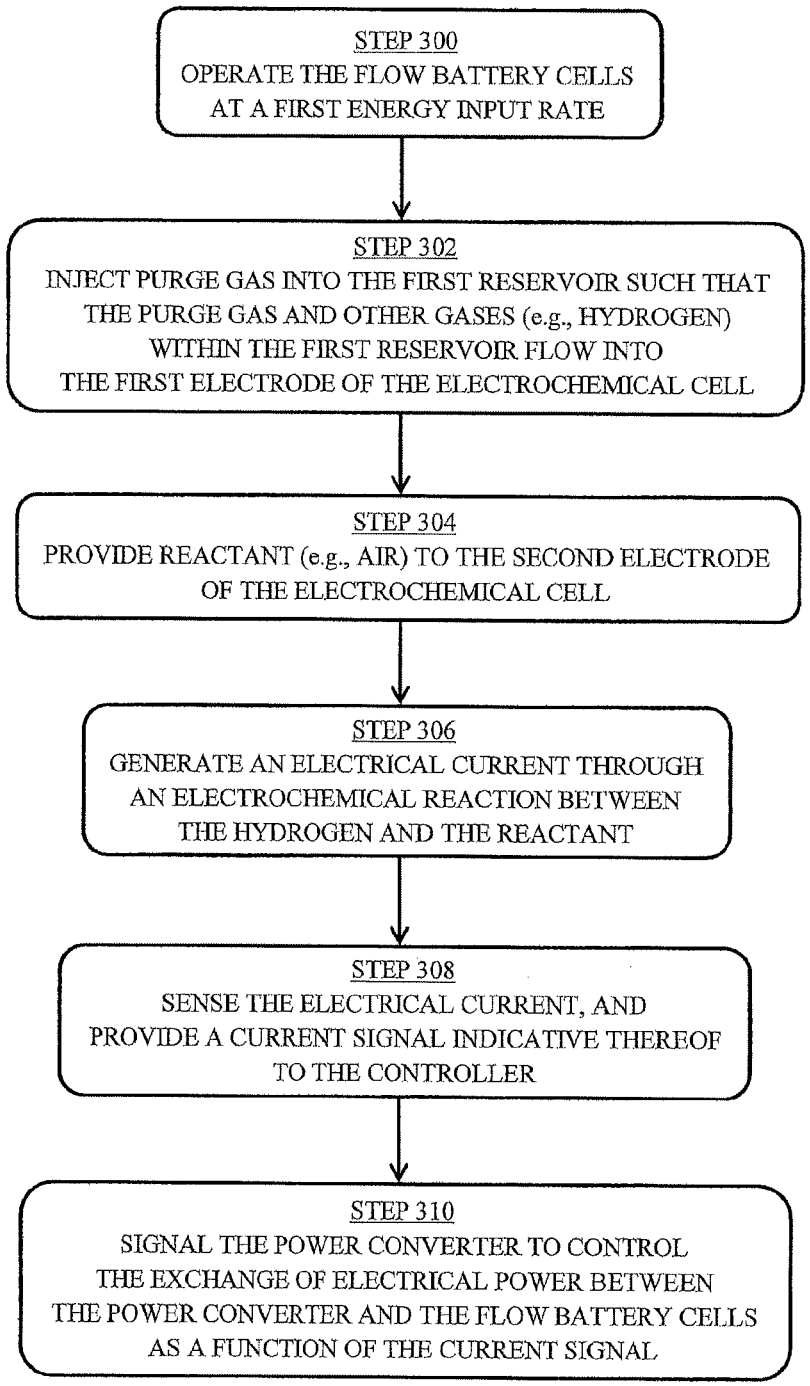
FIG. 3 is a flow chart illustration of steps for charging a flow battery system in a manner that mitigates hydrogen evolution.

FIG. 3 illustrates a method for charging the flow battery system 10 in a manner that mitigates hydrogen evolution. For ease of explanation, the following description begins with an assumption that (i) the state of charge of the first solution is less than approximately 80%, and/or (ii) little or no hydrogen evolution is occurring within the first solution. Referring to FIGS. 1 and 3, in step 300, the controller 32 signals the power converter 30 to provide electrical power (e.g., constant current) to the flow battery stack 20 such that the flow battery cells 54 are operated at a first energy input rate. The electrical power may be controlled at a substantially constant current, power, and/or voltage.

In step 302, the controller 32 signals the purge gas flow regulator 28 to provide purge gas to the first reservoir 12. The injected purge gas creates a positive pressure within the first reservoir 12 such that the purge gas and other gases within the first reservoir 12 flow through the valve 24 and into the first electrode 65. The positive pressure as well as the valve 24 reduce/prevent a backflow of gas (e.g., air) from entering the first reservoir 12 from the electrochemical cell 22. In an alternative embodiment, step 302 may be omitted where overpressure created by the evolution of hydrogen pushes gases within the first reservoir 12 through the valve 24 and into the first electrode 65.

In step 304, reactant (e.g., air) is provided to the second electrode 66. The reactant may be provided via an electronically actuated reactant regulator (not shown), or by diffusion where the second electrode is simply exposed to ambient air.

Hydrogen may form within the first solution through hydrogen evolution when, for example, the first solution has reached a relative high (e.g., >80-90%) state of charge. In step 306, the electrochemical cell 22, which may be operated with a relatively low potential (e.g., 0.2 volts) and/or a relatively low resistance across the electrodes 65 and 66, generates an electrical current when hydrogen formed by hydrogen evolution is provided to the first electrode 65 along with the purge gas. The electrical current is generated through electrochemical reactions on either side of the separator 68, as in a fuel cell 72.

In step 308, the current sensor 70 senses the electrical current generated by the electrochemical reaction between the hydrogen and the reactant, and provides a current signal indicative of the sensed electrical current to the controller 32.

In step 310, the controller 32 processes the current signal, and provides a control signal to the power converter 30. The current signal may be processed, for example, by comparing a value of the current signal to one or more threshold values. Each threshold value is indicative of a predetermined current signal value.

Figure 4:
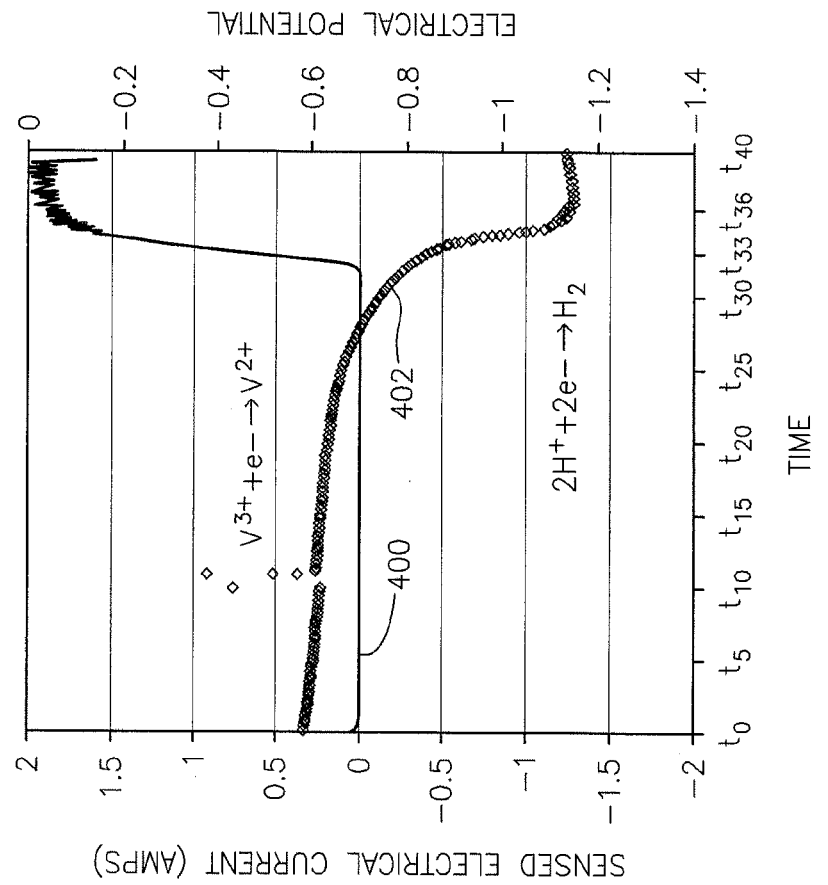
FIG. 4 is a graphical illustration of a first curve showing sensed electrical current versus time, and a second curve showing electrical potential of a first solution versus time.

FIG. 4 is a graphical illustration of (i) a first curve 400 showing the sensed electrical current versus time, and (ii) a second curve 402 showing electrical potential (vs. a hydrogen reference electrode) of the first solution versus time. An example of a threshold value is shown at time $t_{33}$ where the sensed electrical current becomes greater than zero, which corresponds to when hydrogen begins to form within the first solution. Another threshold value is shown at time $t_{36}$ (e.g., where the sensed electrical current is equal to approximately 1.8 amps), which corresponds to when the first solution becomes overcharged (i.e., reaches approximately 100% state of charge). This is also where the electrical potential of first solution levels off because the side reaction (hydrogen evolution) begins consuming substantially all of the current, which is not desirable and is why a method to detect this condition before it occurs is advantageous. FIG. 4 therefore illustrates how the electrochemical cell 22 may detect hydrogen evolution before, for example, it becomes excessive.

The detection of hydrogen evolution within the first solution does not depend on which flow battery cell, or cells, in the flow battery stack are generating hydrogen since the first solution (with hydrogen, if generated) returns to the first reservoir 12. Whereas if one tries to use the flow-battery cell potential, one would need to measure the cell voltages of each of the individual cells, as well as measure the half-cell potentials using a reference electrode. Such a method, however, requires a lot of instrumentation and data collection. The control signal is provided to the power converter 30 to control the exchange of electrical power between the power converter 30 and the flow battery cells 54 as a function of the electrical current generated by the electrochemical cell 22. For example, where the current signal value is greater than or equal to one or more of the threshold values, the control signal may be used to (i) iteratively or continuously reduce power (e.g., the current density) within the flow battery cells 54, or (ii) stop the exchange of electrical power between the power converter 30 and the flow battery cells 54. The current density may be reduced, for example, to a predetermined level that corresponds to a respective one of the thresholds met by the current signal value. Alternatively, the current density may be reduced as a function of the electrical current being generated by the electrochemical cell 22 such that as the current signal value increases, the current density decreases.

The formation of hydrogen within the first solution due to hydrogen evolution may be mitigated using the aforesaid method. For example, when the current sensor 70 initially senses an electrical current caused by an electrochemical reaction between the hydrogen and the reactant, the controller 32 may signal the power converter 30 to stop providing electrical current to the flow battery stack 20 to prevent additional formation of hydrogen. In another example, when the current sensor 70 initially senses the electrical current, the controller 32 may signal the power converter 30 to reduce the electrical current being provided to the flow battery stack 20 to reduce the hydrogen evolution rate. However, once the current signal value is greater than or equal to a specified threshold value (e.g., where the rate of hydrogen production is considered to be excessive), the controller 32 may signal the power converter 30 to stop providing electrical current to the flow battery stack 20 to prevent the first solution from becoming overcharged and thus from generating excessive hydrogen. The aforesaid method may also improve the safety of the flow battery system 10 by consuming the hydrogen gas produced by hydrogen evolution through the electrochemical reaction within the electrochemical cell 22.

In some embodiments, the controller 32 may additionally or alternatively process the sensed current signal to determine how much hydrogen is being formed within the first solution using Faraday's Law. The hydrogen that is consumed in the first electrode 65, for example, is equal to I/2F, where I is the current sensed by the sensor 70 and F is Faraday constant (96,485 coulombs/mol).

Figure 5:
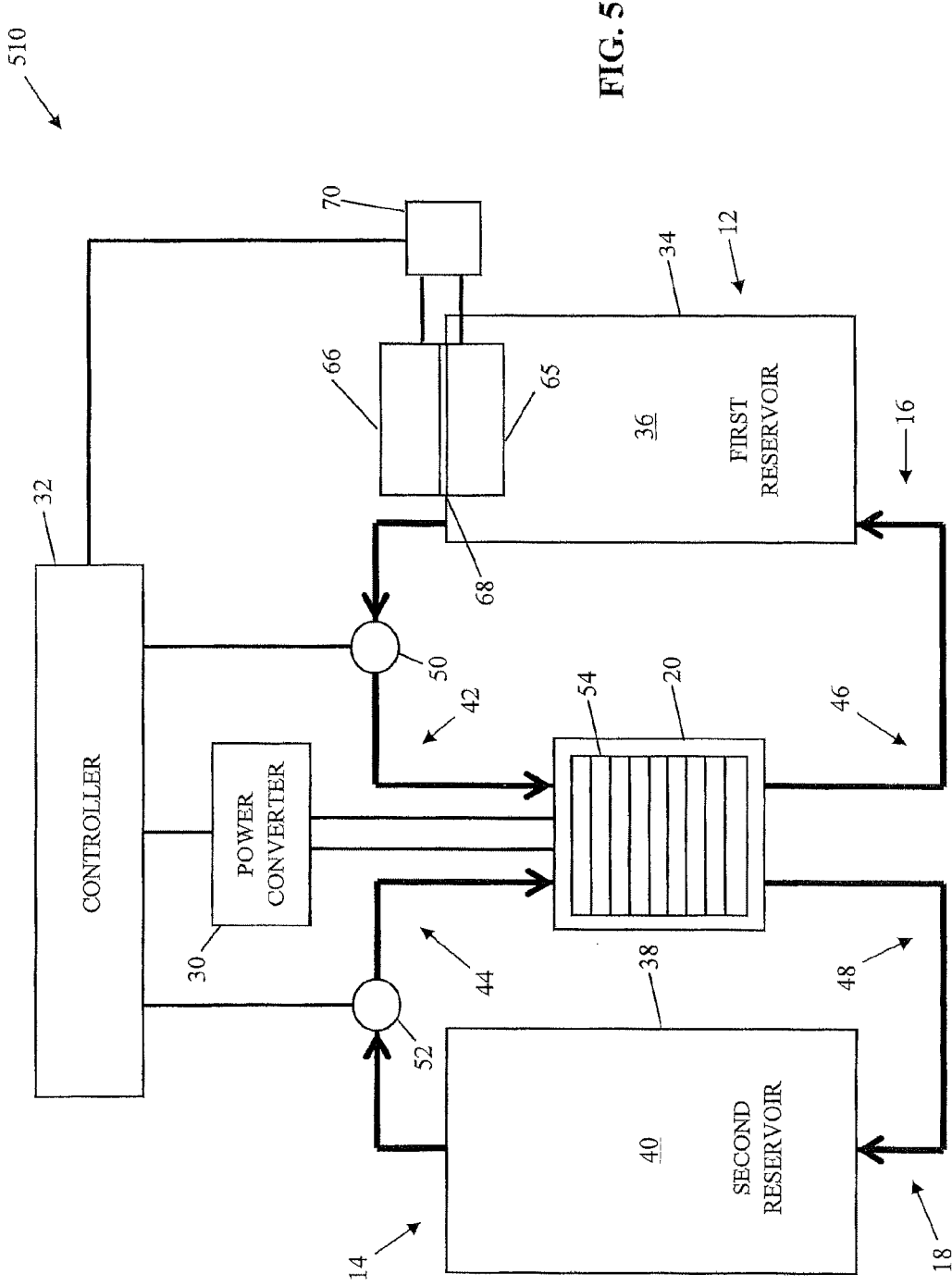
FIG. 5 illustrates an alternative embodiment flow battery system.

FIG. 5 illustrates an alternative embodiment of a flow battery system 510. In contrast to the flow battery system 10 shown in FIG. 1, the first electrode 65 is located within the exterior reservoir wall 34, while the second electrode 66 remains located outside of the exterior reservoir wall 34. This configuration may reduce the complexity of the system since, for example, the valve 24 may be omitted. The purge gas reservoir 26 may also be omitted since the likelihood of air entering the first electrode 65 and flowing into the first reservoir 12 is greatly reduced as the first electrode 65 is sealed within the first reservoir 12. The electrodes 65 and 66 and the separator 68 may also be designed and configured in such a way to ensure that most of the water produced drains back to the first reservoir 36, if desired.

While various embodiments of the flow battery system have been disclosed, it will be apparent to those of ordinary skill in the art that many more embodiments and implementations are possible within the scope of the flow battery system. Accordingly, the present flow battery system is not to be restricted except in light of the attached claims and their equivalents.

What is claimed is:

1. A method for mitigating hydrogen evolution within a flow battery system that comprises a plurality of flow battery cells, a power converter and an electrochemical cell, the method comprising:
   providing hydrogen generated by the hydrogen evolution within the flow battery system to the electrochemical cell;
   providing reactant to the electrochemical cell;
   generating a first electrical current through an electrochemical reaction between the hydrogen and the reactant using the electrochemical cell; and
   controlling an exchange of electrical power between the flow battery cells and the power converter in response to the first electrical current.

2. The method of claim 1, wherein the reactant comprises air.

3. The method of claim 1, wherein the controlling of the exchange of the electrical power comprises stopping the exchange of the electrical power between the flow battery cells and the power converter when the first electrical current is greater than a threshold value.

4. The method of claim 3, wherein the threshold value corresponds to one of
   where a first solution within the flow battery system has greater than approximately ninety percent state of charge; and
   where hydrogen begins to form within the first solution.

5. The method of claim 1, wherein the controlling of the exchange of electrical power comprises one of
   reducing current density within the flow battery cells when the first electrical current is greater than a threshold value; and
   reducing voltage across the flow battery cells when the first electrical current is greater than the threshold value.

6. The method of claim 5, wherein the threshold value corresponds to one of
   where a first solution within the flow battery system has greater than approximately ninety percent state of charge; and
   where hydrogen begins to form within the first solution.

7. The method of claim 1, wherein the controlling of the exchange of electrical power comprises:
   sensing the first electrical current using a current sensor, and providing a current signal indicative of the sensed first electrical current to a controller; and
   processing the current signal to provide a control signal to the power converter.

8. The method of claim 1, wherein the hydrogen is provided to the electrochemical cell from a reservoir in the flow battery system that contains a first solution having a first reversible redox couple reactant.

9. The method of claim 8, further comprising directing the hydrogen from the reservoir to the electrochemical cell through a valve.

10. The method of claim 8, further comprising purging the hydrogen from the reservoir such that the hydrogen flows into the electrochemical cell.

* * * * *